(12) United States Patent
Herrin et al.

(10) Patent No.: US 12,051,959 B2
(45) Date of Patent: Jul. 30, 2024

(54) TORQUE-INCREASING DEVICE

(71) Applicants: Robert M. Herrin, Orlando, FL (US); Sean R. Khant, Tampa, FL (US)

(72) Inventors: Robert M. Herrin, Orlando, FL (US); Sean R. Khant, Tampa, FL (US)

( * ) Notice: Subject to any disclaimer, the term of this patent is extended or adjusted under 35 U.S.C. 154(b) by 285 days.

(21) Appl. No.: 17/326,509

(22) Filed: May 21, 2021

(65) Prior Publication Data
US 2021/0320580 A1    Oct. 14, 2021

Related U.S. Application Data

(63) Continuation-in-part of application No. 16/847,739, filed on Apr. 14, 2020, now Pat. No. 11,018,569.

(51) Int. Cl.
*H02K 49/10*    (2006.01)

(52) U.S. Cl.
CPC ......... *H02K 49/102* (2013.01); *H02K 49/108* (2013.01)

(58) Field of Classification Search
CPC ................... H02K 53/00; H02K 49/00–49/12
USPC ......................................................... 310/103
See application file for complete search history.

(56) References Cited

U.S. PATENT DOCUMENTS

| | | |
|---|---|---|
| 1,495,784 A | 5/1924 | Fereday |
| 3,299,819 A | 1/1967 | McMoy |
| 3,992,641 A * | 11/1976 | Heinrich ............. H02K 19/103 310/49.43 |
| 4,767,378 A | 8/1988 | Obermann |
| 6,054,788 A | 4/2000 | Dombrovski et al. |
| 6,411,001 B1 | 6/2002 | Henderson et al. |
| 6,841,910 B2 | 1/2005 | Gery |
| 7,024,963 B2 | 4/2006 | French |
| 7,268,454 B2 | 9/2007 | Wise |
| 8,690,687 B1 | 4/2014 | Tsai et al. |
| 9,863,480 B2 | 1/2018 | Puchhammer |
| 10,224,798 B2 | 3/2019 | Leas |
| 11,018,569 B1 * | 5/2021 | Herrin .................... H02K 41/06 |
| 2004/0066107 A1 | 4/2004 | Gery |
| 2006/0111191 A1 | 5/2006 | Wise |
| 2006/0119201 A1 | 6/2006 | Nissen |
| 2007/0007835 A1 | 1/2007 | Wise |
| 2008/0090694 A1 | 4/2008 | Wise et al. |
| 2014/0042851 A1 * | 2/2014 | Takemoto ............. H02K 1/243 29/598 |

(Continued)

FOREIGN PATENT DOCUMENTS

| | | |
|---|---|---|
| DE | 38410112 | 7/1990 |
| DK | 0962044 | 6/2003 |

*Primary Examiner* — Thomas Truong
(74) *Attorney, Agent, or Firm* — Larson & Larson; Justin P. Miller; Frank Liebenow

(57) ABSTRACT

The torque-increasing device includes multiple rotating discs, rings, or rotors, each including embedded or affixed magnets. The discs are canted toward each other, thus passing closer to each during the first half of a rotation, and further apart during the second half of a rotation. As the adjacent magnets attract each other, the attractive force is split into two vectors: a vector that is perpendicular to an imaginary plane that divides the discs, and a torque vector that is parallel to the face of the rotors. Disruption of the attraction of the magnets on either the upper or lower half of the rotor, or a segment of the upper or lower half, unbalances the rotors and captures a torque.

18 Claims, 11 Drawing Sheets

(56) References Cited

U.S. PATENT DOCUMENTS

2021/0000990 A1    4/2021  Bird
2021/0320580 A1*  10/2021  Herrin .................. H02K 49/108

* cited by examiner

TORQUE-INCREASING DEVICE

This application is a continuation-in-part of U.S. patent application Ser. No. 16/847,739 titled Torque augmentation device, filed Apr. 14, 2020, and issued May 25, 2021, as U.S. Pat. No. 11,018,569.

FIELD

This invention relates to the field of mechanical devices producing rotational energy and more particularly to a device that captures additional torque in a rotating system.

BACKGROUND

Rotational mechanical energy is the workhorse of our world. From pumping liquids to moving trains, rotational motion is critical.

While horsepower is the metric most often cited when discussing the capability of a machine, it is torque that allows machines to accomplish their work. Without the torque to rotate, there is no work.

What is needed is a system for increasing the torque of a rotational system, thus increasing its capacity for work.

SUMMARY

The torque-increasing device includes multiple rotating discs, rings, or rotors, each including embedded or affixed magnets. The discs are canted toward each other, thus passing closer to each during the first half of a rotation, and further apart during the second half of a rotation.

As the adjacent magnets attract each other, the attractive force is split into two vectors: a vector that is perpendicular to an imaginary plane that divides the discs, and a torque vector that is parallel to the face of the rotors.

The torque captured by the magnetic attraction is always toward the section of the discs where the magnets are closest—the magnets prefer to be closer together rather than further apart.

The upper 180-degree segment of magnets wants to rotate in a first direction to be closer together, and the lower 180-degree segment of magnets wants to rotate in a second direction to be closer together. The first and second directions are opposites, thus the torques cancel out.

As a result, the rotors are static, with the opposing torques resulting in no motion.

The solution is to disrupt the attraction of the magnets on either the upper or lower half of the rotor, or a segment of the upper or lower half, thus unbalancing the magnetic forces and causing rotation.

One cannot prevent the magnets from interacting with each other, but the interaction can be modified or guided using a ferrous diversion plate, with or without magnets. If magnets are used for flux line diversion, they can be located at a diameter greater than the outermost magnets of the rotors, or within a diameter of the innermost magnets.

The flux line diversion magnets are preferably located in the gap between the rotating discs.

This interference is visualized as a modification to the flux lines, or the field lines created by the magnetic field.

By changing the angle of the magnetic field between the discs, the force vector is modified. This magnetic modification is applied to only a section of the discs, resulting in an imbalance.

The goal is to alter the path of flux lines, thus preventing capture of the torque during a segment of the rotation. The result is an imbalanced torque.

The magnetic discs, rotors, or rings rotate together on a common shaft. By mechanically coupling the rotation together, the magnetic interaction across the rotor and rings is maintained, and the torque vector, which is parallel to the rotor faces, is transferred to the shaft.

While the preferred embodiment is as described, alternative embodiments are anticipated.

For example, permanent magnets are preferred, but electromagnets are a possible substitution.

Discrete permanent magnets are shown, but arc-shaped magnets can be substituted to result in a smoother action, rather than the "cogging" or stepped rotation effect that discrete magnets can cause.

As shown in the drawings, the magnets are preferably placed in a Halbach arrangement, thus focusing the magnetic flux away from the rotor and plate faces.

For example, stacked atop each other, a typical Halbach arrangement of magnets is:
N-S magnet horizontal
N-S magnet vertical
S-N magnet horizontal Magnetic flux is a measurement of the magnetic field that passes through a given area. The measurement and illustration of magnetic flux is used to understand and measure the magnetic field present across a given area. Flux lines are a visualization of the magnetic field.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
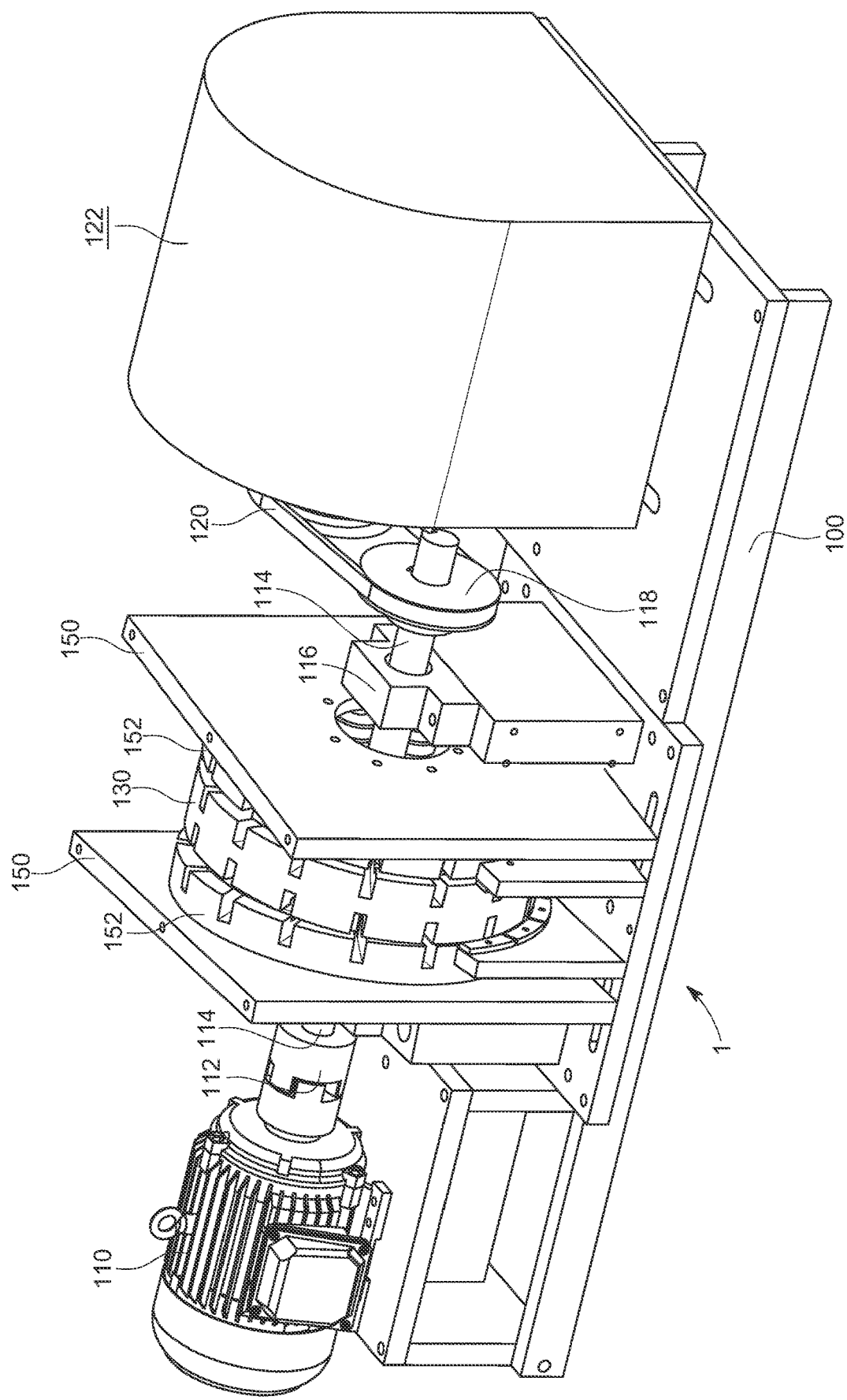
FIG. 1 illustrates a first isometric view of the torque-increasing device.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a first isometric view of the torque-increasing device is shown.

The torque-increasing device 1 is shown with commonly-associated accessory components. These include frame 100 with driver 110, affixed to shaft 114 via a coupling 112. The shaft 114 rotates on bearing blocks 116. Also shown is a load 122 connected to the shaft via pulleys 118 and belt 120.

The torque-increasing device 1 is formed from a rotating assembly 130 placed between static plates 150, each of which supports a rotating ring 152. The rotating ring 152 is shown supported by bearings 250, each of which rotates about a bearing shaft 252, the bearing shaft 252 supported by the static plate 150.

The rotating rings 152 are canted, or set an angle, with respect to the rotating assembly 130.

Figure 2:
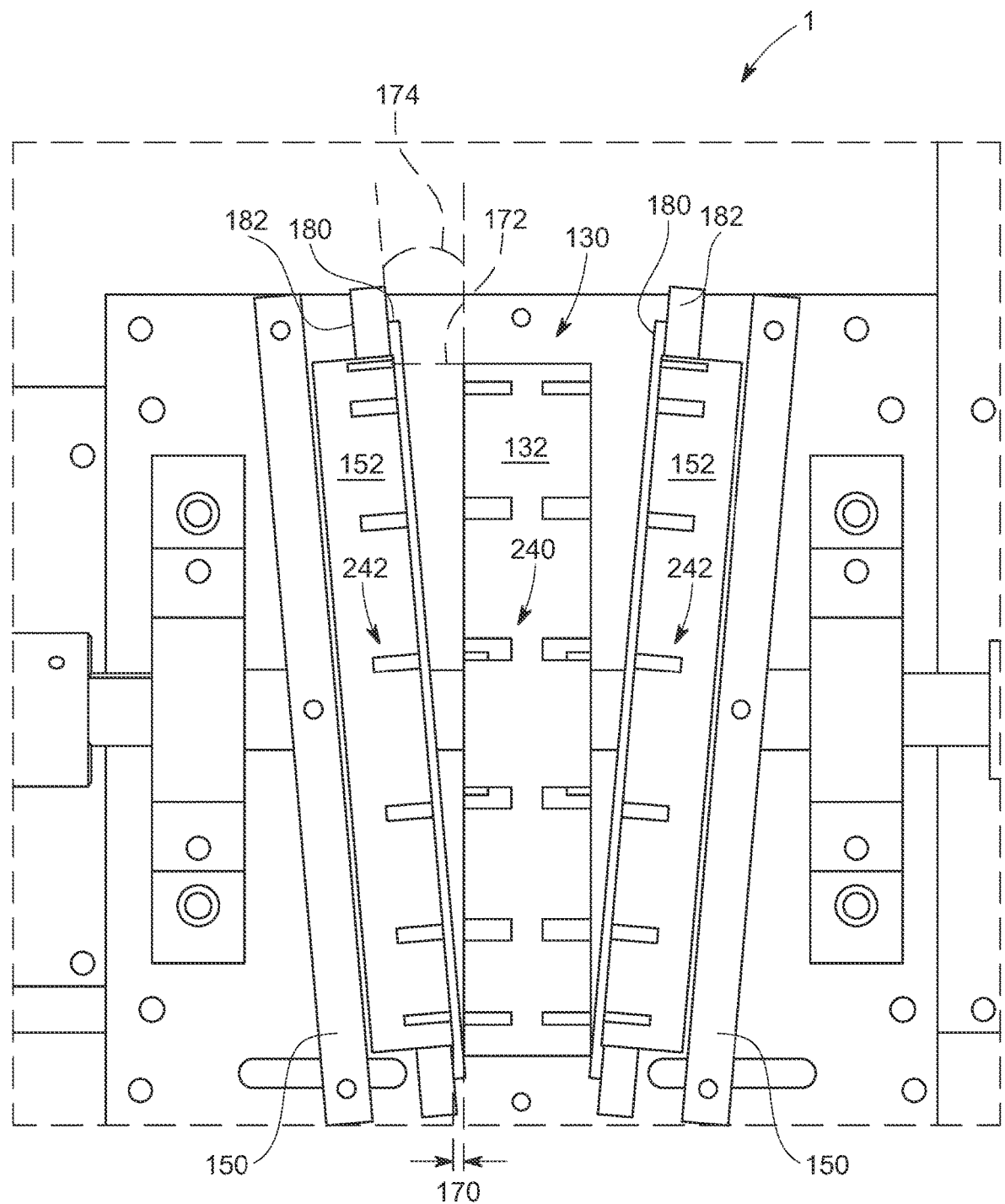
FIG. 2 illustrates a top view of the magnetic assemblies of the torque-increasing device.

Referring to FIG. 2, a top view of the magnetic assemblies of the torque-increasing device is shown.

The torque-increasing device 1 is shown with rotating assembly 130—formed primarily of rotor 132—and rotating rings 152, the rotating ring 152 supported by bearings 250, each of which rotates about a bearing shaft 252, the bearing shaft 252 supported by the static plate 150.

The rotor 132 spins in rotor rotation direction 240, and the rotating rings 152 spins in a matching direction, shown as ring rotation direction 242.

The canted, or angled, relationship of the rotor 132 and rings 152 results in a minimum magnetic gap 170, a maximum magnetic gap 172, and a rotor angle with respect to static plate 174.

As discussed further below, the diversion magnets 180 and diversion magnet plate 182 are set in a plane parallel to the static plate 150 and rotating ring 152.

Figure 3:
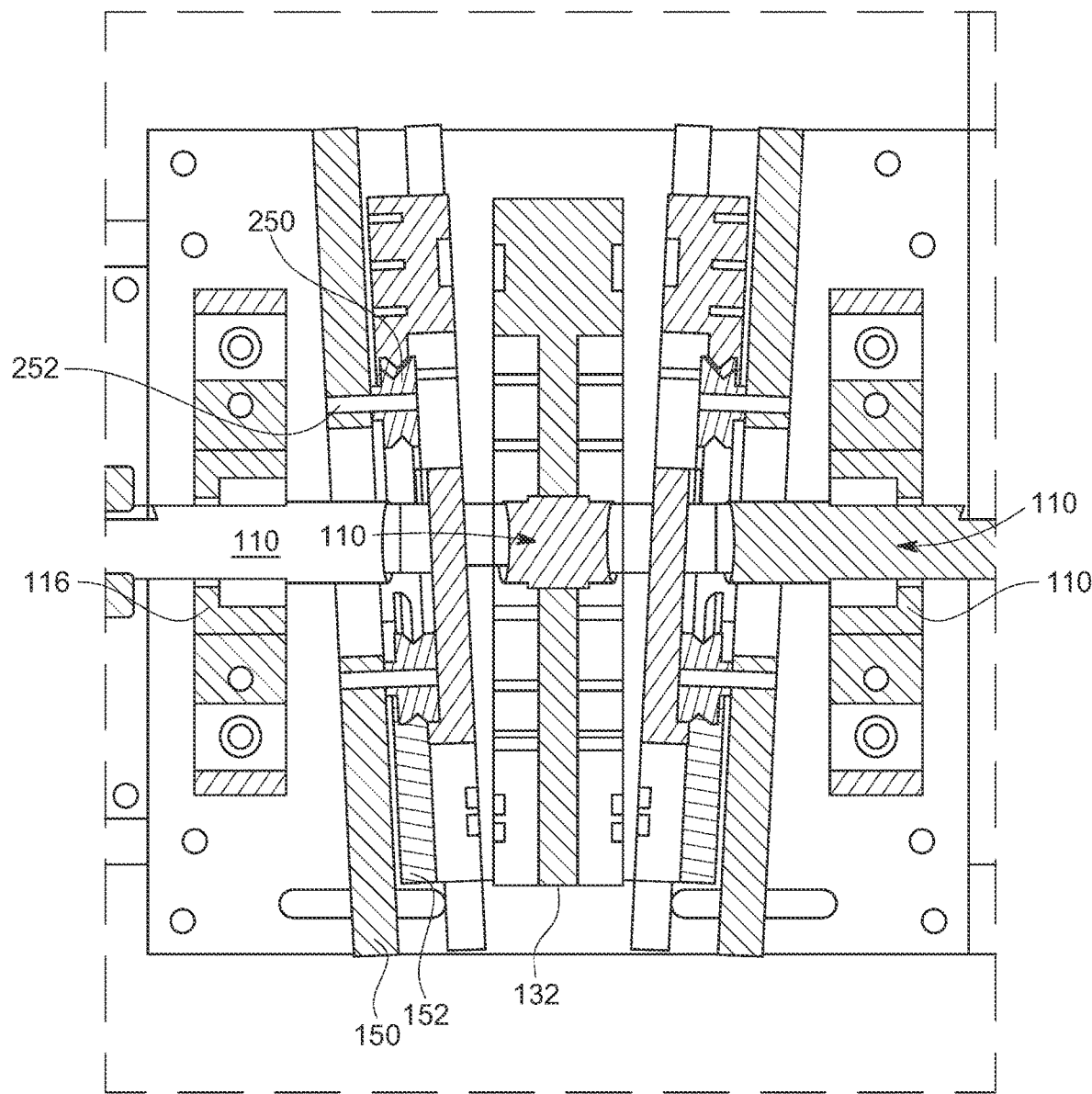
FIG. 3 illustrates a cross-sectional view of the magnetic assemblies of the torque-increasing device.

Referring to FIG. 3, a cross-sectional view of the magnetic assemblies of the torque-increasing device is shown.

The rotating ring 152 is shown supported by bearings 250, each of which rotates about a bearing shaft 252, the bearing shaft 252 supported by the static plate 150.

Figure 4:
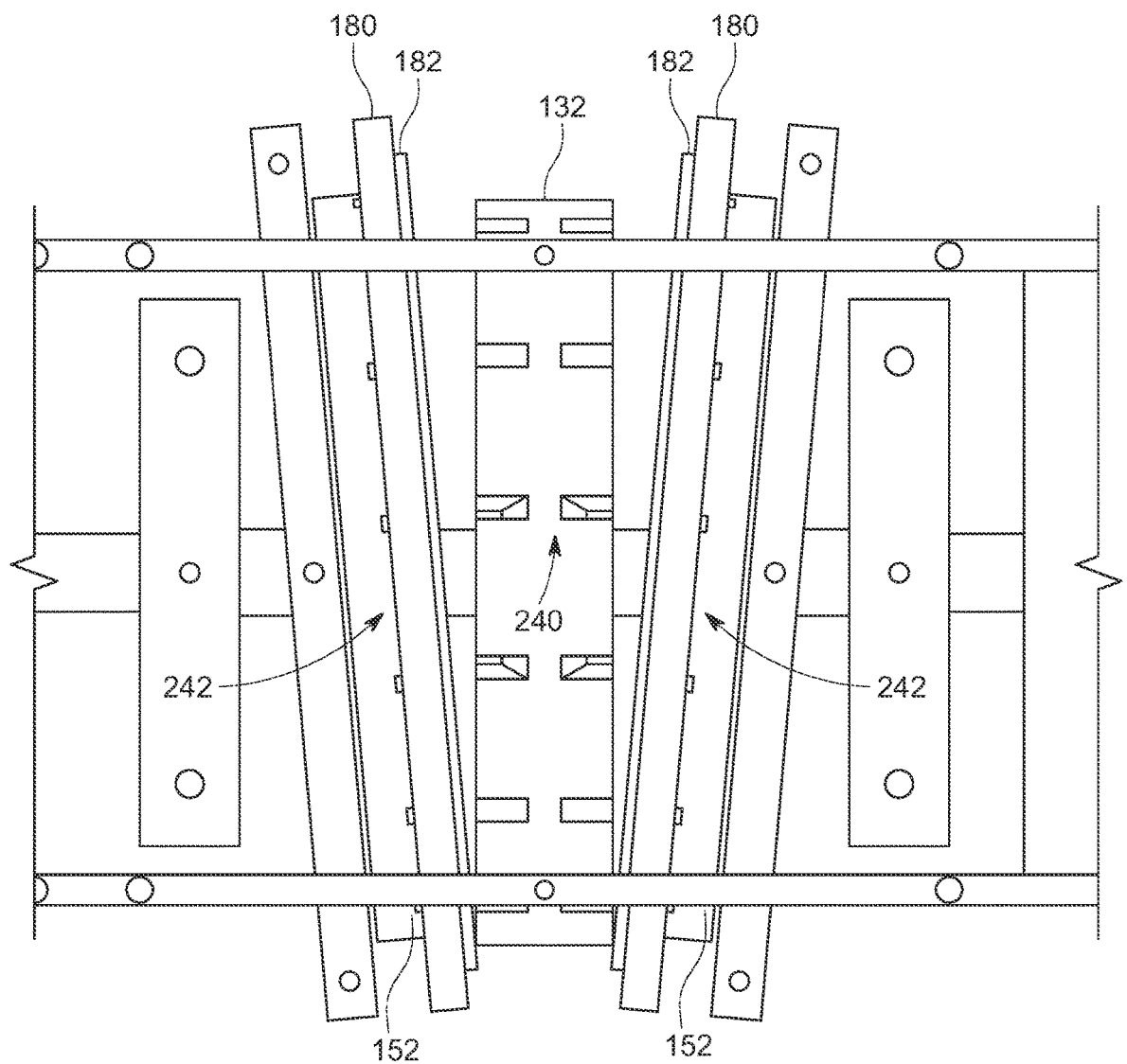
FIG. 4 illustrates a bottom view of the magnetic assemblies of the torque-increasing device.

Referring to FIG. 4, a bottom view of the magnetic assemblies of the torque-increasing device is shown.

Again shown are diversion magnets 180 affixed to diversion magnet plate 182. The diversion magnets 180 are parallel to their respective rotating rings 152, and at an angle with respect to rotor 132. The directions of spinning are shown as rotor rotation direction 240 and ring rotation direction 242.

Figure 5:
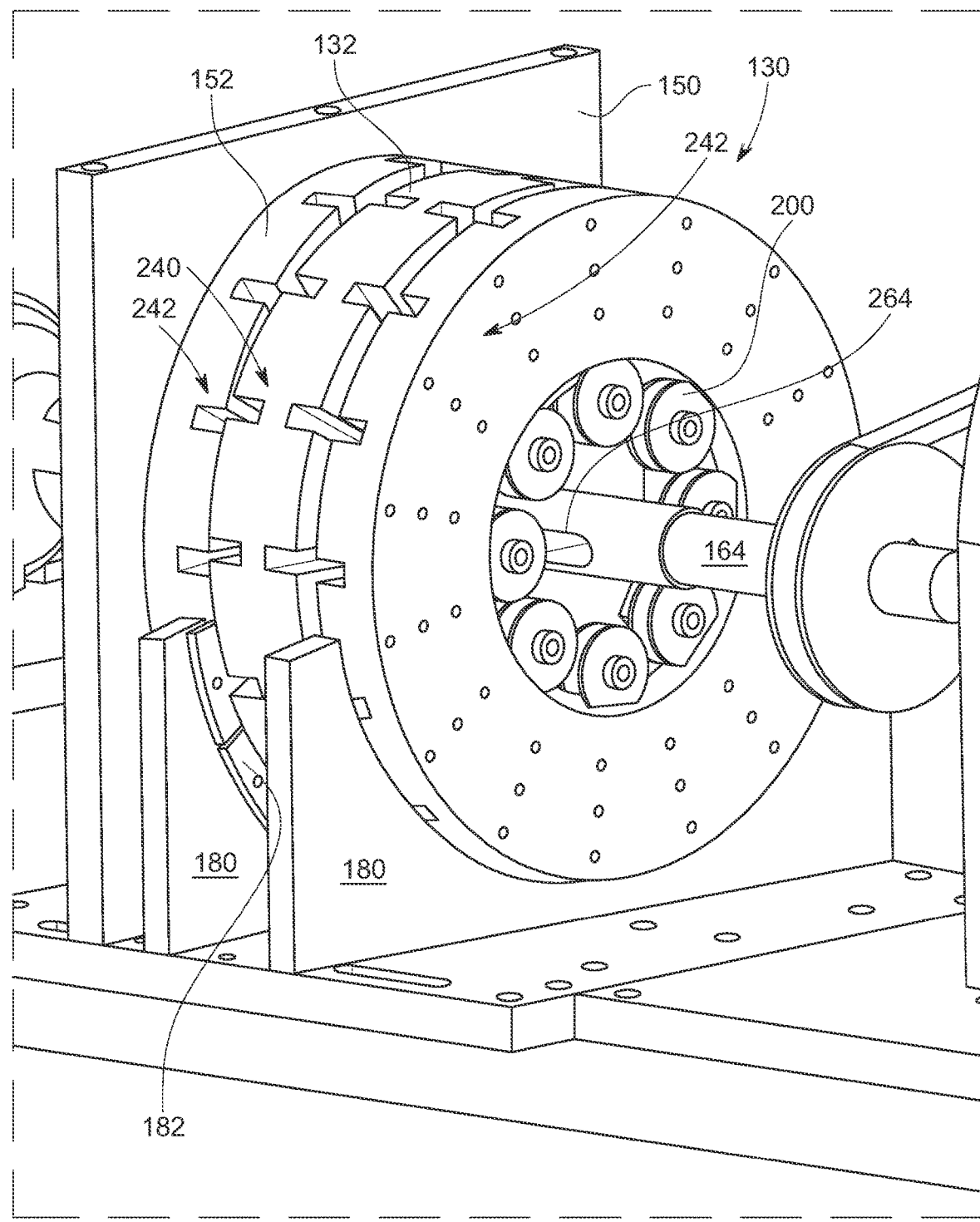
FIG. 5 illustrates an isometric view of the magnetic assemblies of the torque-increasing device.

Referring to FIG. 5, an isometric view of the magnetic assemblies of the torque-increasing device is shown.

The rotor 132 and rotating rings 152 are shown rotating, with the diversion magnets 180 set just outside the radius of the rotating rings. By diverting the flux lines between the magnets of the rotor 132 and the magnets of the rotating rings 152 during the lower segment of rotation, an unbalanced torque is captured.

Also visible is the drive pin slot 264 within the shaft 114. The drive pin slot 264 interacts with a drive pin 260 (see FIG. 10) and drive pin block 262 (see FIG. 10) to keep the rotor 132 and rotating rings 152 rotating together.

Figure 6:
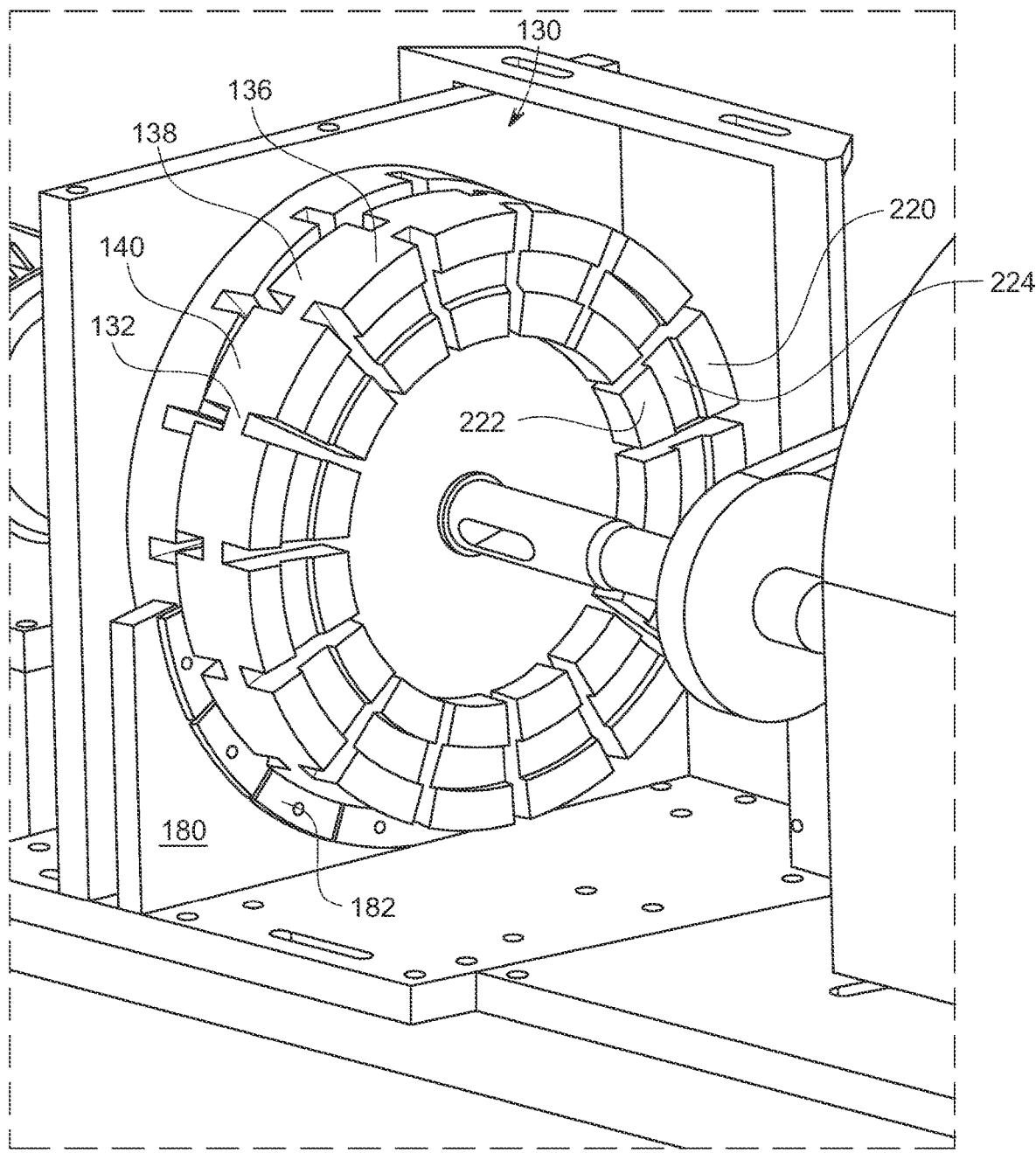
FIG. 6 illustrates an isometric view of the magnetic assemblies, with a rotating ring hidden, of the torque-increasing device.
Figure 7:
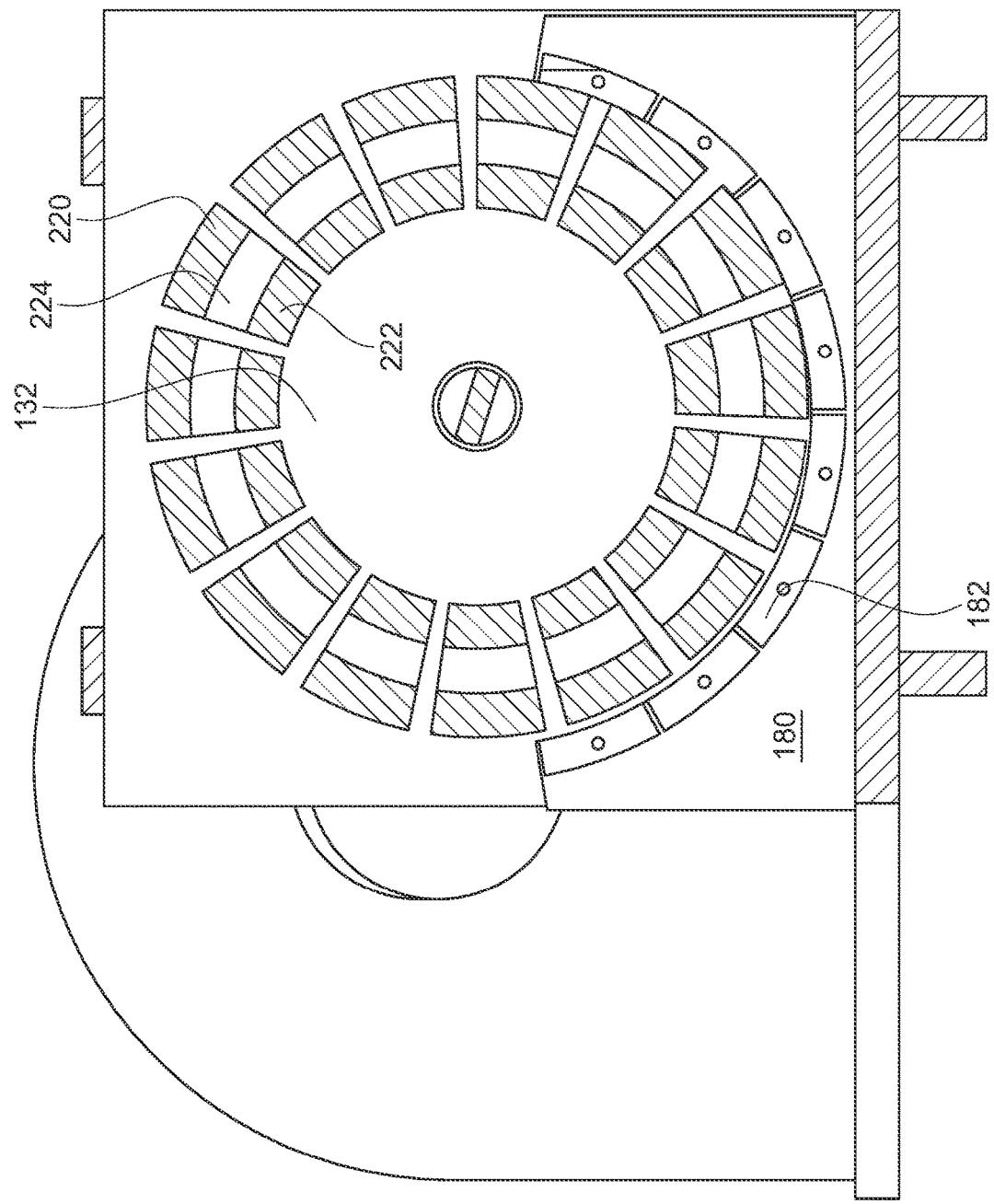
FIG. 7 illustrates a cross-sectional view of the rotating assembly of the torque-increasing device.

Referring to FIGS. 6 and 7, an isometric view and a cross-sectional view of the magnetic assemblies, with a rotor hidden, of the torque-increasing device are shown.

The rotating assembly 130 is formed from a rotor 132 with a first face 134 that includes a first magnet set 136, and a second face 138 that includes a second magnet set 140.

Each magnet set 136/140 includes rotor outer magnets 220, rotor inner magnets 222, and rotor center magnets 224.

Figure 8:
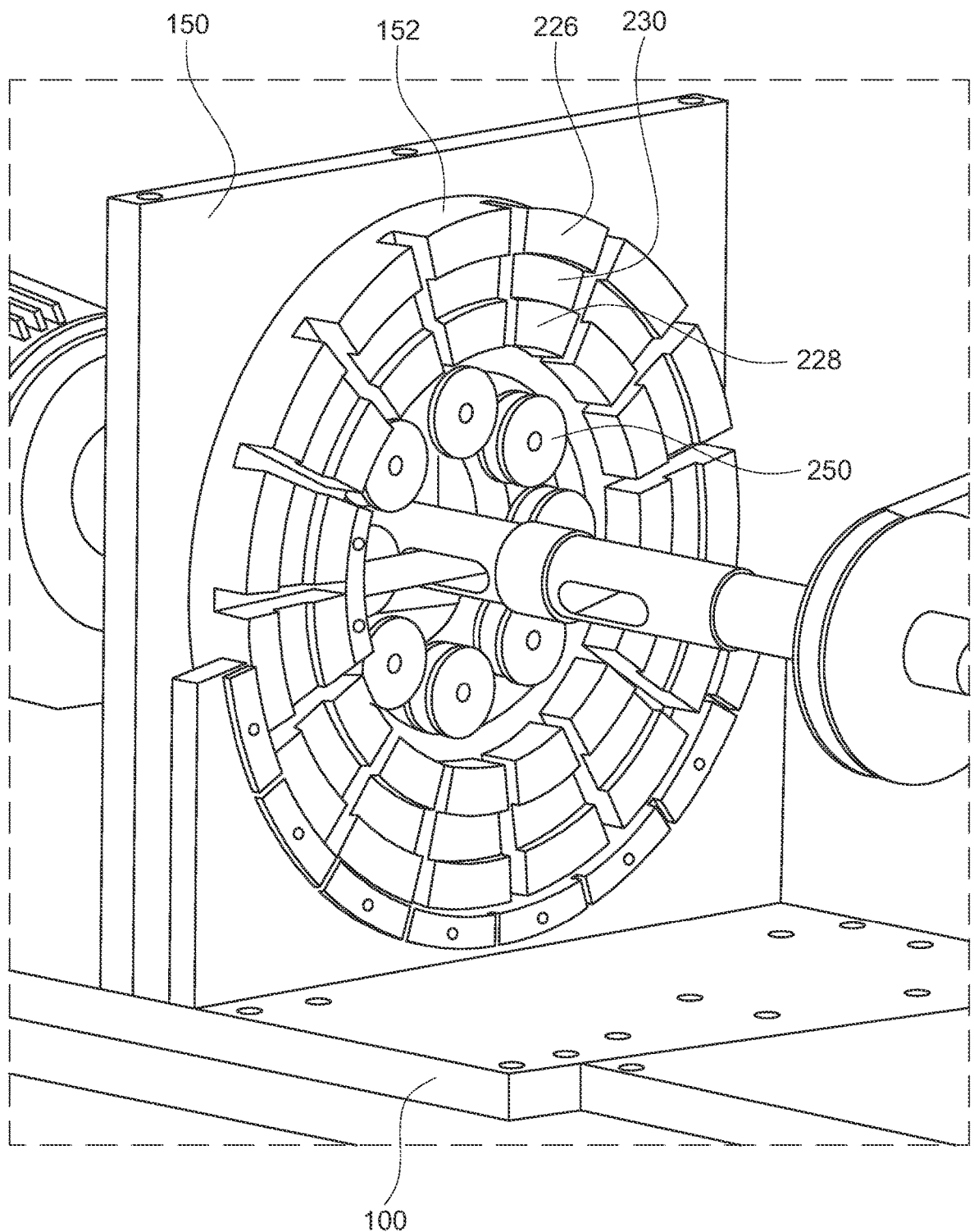
FIG. 8 illustrates an isometric view of the rotating ring of the torque-increasing device.
Figure 9:
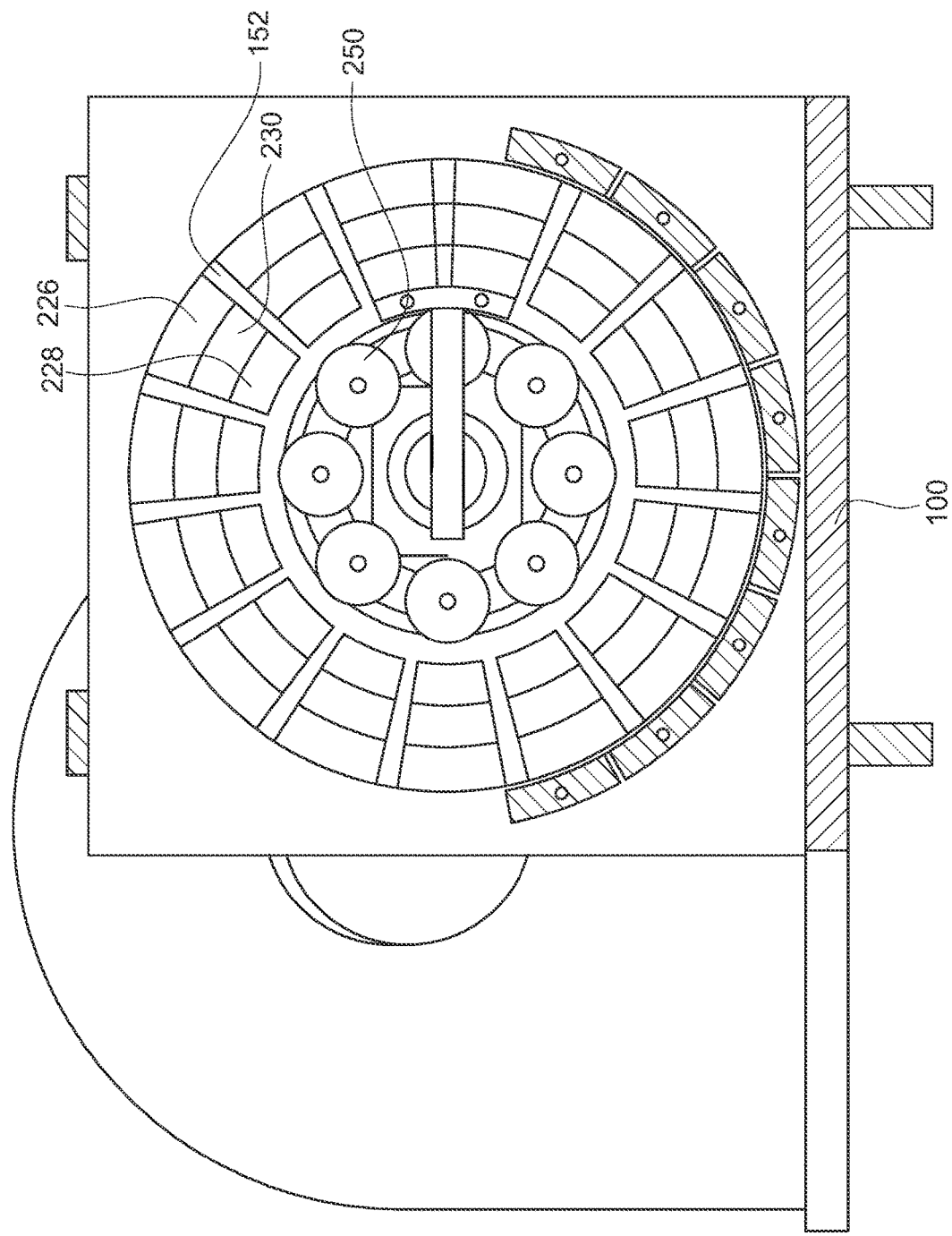
FIG. 9 illustrates a cross-sectional view of the rotating ring of the torque-increasing device.

Referring to FIGS. 8 and 9, an isometric view and a cross-sectional view of the rotating ring of the torque-increasing device is shown.

The rotating ring 152 includes ring outer magnets 226, ring inner magnets 228, and ring center magnets 230.

The rotating ring 152 is supported by bearings 250, which transfer the weight of the rotating ring 152 to the static plate 150.

Figure 10:
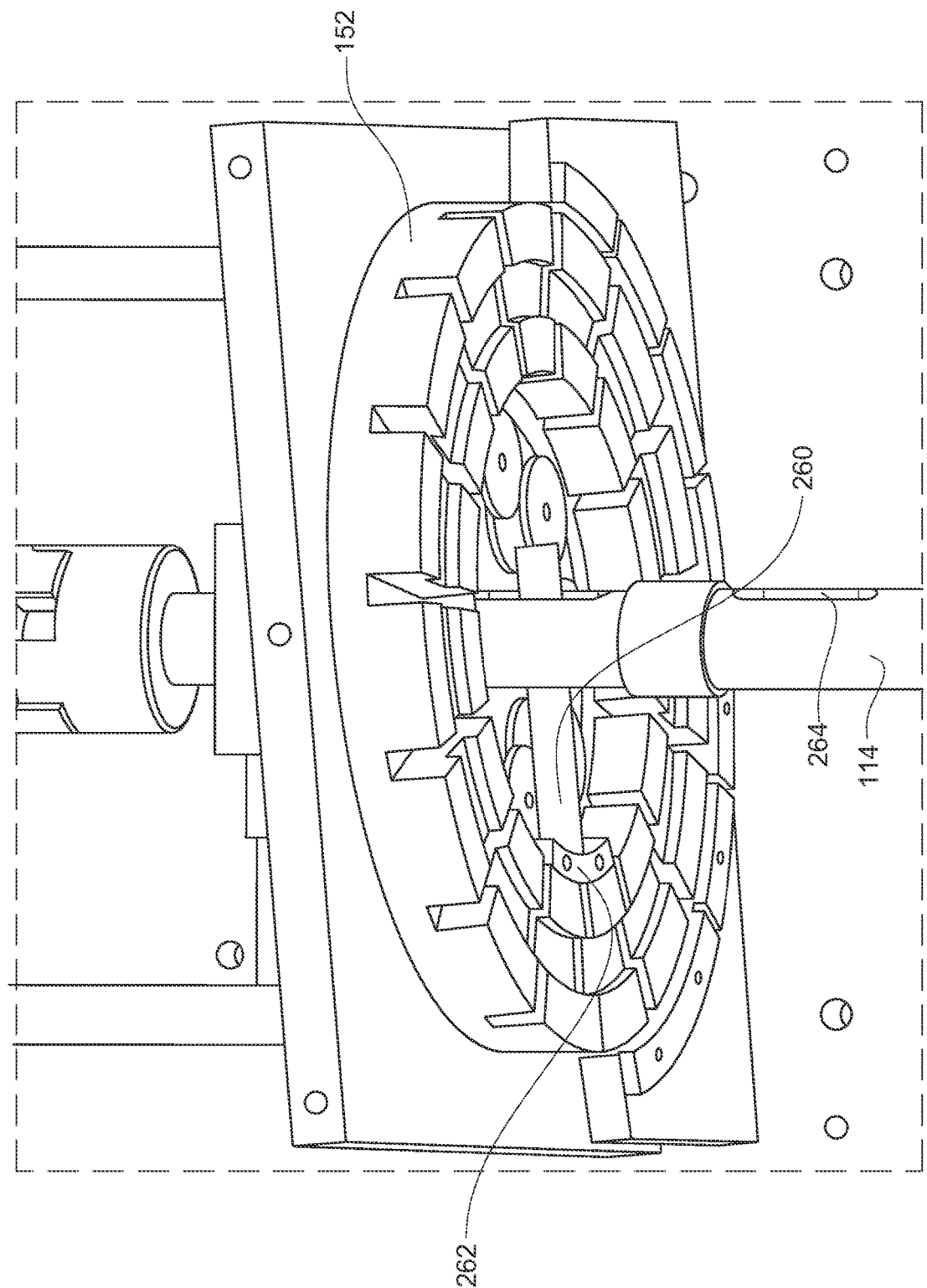
FIG. 10 illustrates a top-isometric view of the rotating ring of the torque-increasing device.

Referring to FIG. 10, a top-isometric view of the rotating ring of the torque-increasing device is shown.

The drive pin 260 mechanically connects the rotating ring 152 via a drive pin block 262, to the drive pin slot 264 in the shaft 114.

The use of the drive pin slot 264 to connect the rotating ring 152 to the shaft 114 is one means of ensuring matching rotation. Other means of connecting are anticipated, such as gears, pulleys, belts, and so forth.

Figure 11:
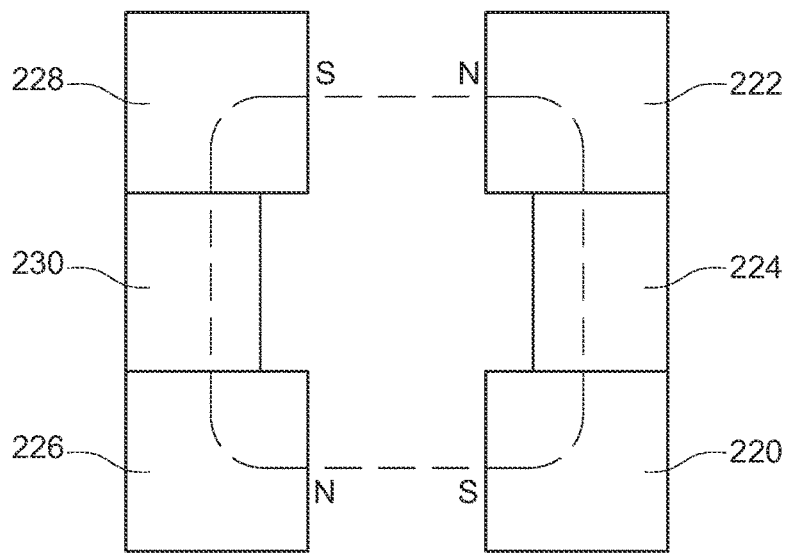
FIG. 11 illustrates a schematic view of the interaction between ring and rotor magnets of the torque-increasing device.
Figure 12:
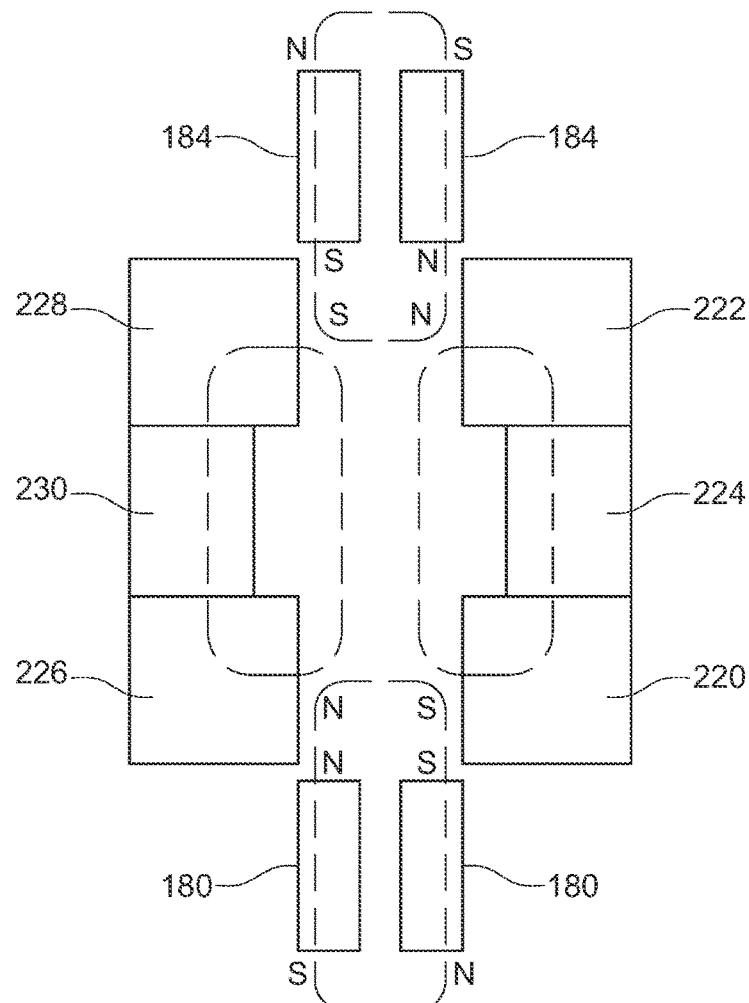
FIG. 12 illustrates a schematic view of the interaction between ring and rotor magnets, with the addition of diversion magnets, of the torque-increasing device.

Referring to FIGS. 11 and 12, schematic views of the interaction between ring and rotor magnets of the torque-increasing device, without and with diversion magnets, are shown.

In FIG. 11, the rotor outer magnet 220, rotor inner magnet 222, rotor center magnet 224 are shown affixed to the rotor 132 (see FIG. 6) and the ring outer magnet 226, ring inner magnet 228, and ring center magnet 230 are shown affixed to the rotating ring 152 (see FIG. 8).

Without any diversion of magnetic fields, the continuous flux line 232 passes directly from the magnets of the rotor 132 (left side) to the magnets of the ring 152 (right side).

In FIG. 12, diversion magnets 180 and upper diversion magnets 184 are shown. The flux lines now follow a diverted path, shown as diverted flux line 234. The diversion of the flux lines reduces the magnetic interaction of the rotor 132 (left side) and the ring 152 (right side). Thus, by diverting the flux lines for less than an entire rotation of the rotor 132 and ring 152, an unbalanced/uneven torque is captured. This torque is applied to the shaft 114 (see FIG. 5), and aids in its rotation.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A device for capturing a torque, the device comprising:
a shaft;
a first rotor with first magnets, a second rotor with second magnets, and a third rotor with third magnets;
the first rotor, the second rotor, and the third rotor each affixed to the shaft;
the first rotor supported by first bearings, the first bearings supported by a first static plate;
the second rotor supported by second bearings, the second bearings supported by a second static plate;
the first rotor at a first angle with respect to the second rotor;

the first angle creating:
a first minimum magnetic gap measured at a closest point between the first rotor and the second rotor;
a first maximum magnetic gap measured at a furthest point between the first rotor and the second rotor;
the third rotor at a third angle with respect to the second rotor;
the third angle creating:
a third minimum magnetic gap measured at a closest point between the third rotor and the second rotor;
a third maximum magnetic gap measured at a furthest point between the third rotor and the second rotor.

2. The device for capturing a torque of claim 1, further comprising:
a magnetic diversion plate.

3. The device for capturing a torque of claim 2, wherein the magnetic diversion plate is formed from a ferrous material.

4. The device for capturing a torque of claim 2, wherein the magnetic diversion plate further comprising a set of diversion magnets.

5. The device for capturing a torque of claim 2, further comprising:
a second magnetic diversion plate;
the second magnetic diversion plate adjacent to the third rotor and the second rotor;
the magnetic diversion plate interacting with a magnetic field generated by the third magnets and the second magnets;
the magnetic diversion plate interacting with the magnetic field for less than a full rotation of the first rotor, thereby unevenly affecting the magnetic field, thus causing an uneven torque.

6. The device for capturing a torque of claim 2, wherein the magnetic diversion plate interacts with the first magnets and second magnets for one-half of a 360-degree rotation or less.

7. A torque augmentation device comprising:
a rotor;
the rotor being free to rotate about a first axis;
the rotor having a first face with a first magnet set;
the rotor having a second face with a second magnet set;
a first rotating ring;
the first rotating ring having an inner face with a first-half magnet set;
the first rotating ring supported by first bearings, the first bearings supported by a first static plate;
the first rotating ring set at an angle with respect to the rotor;
the angle creating:
a minimum magnetic gap measured at a closest point between the rotor and the first rotating ring;
a maximum magnetic gap measured at a furthest point between the rotor and the first rotating ring;
the first magnet set magnetically interacting with the first-half magnet set;
the angle resulting in an unbalanced magnetic force between the first magnet set and the first-half magnet set;
a set of diversion magnets;
the set of diversion magnets adjacent to an increasing gap between the rotor and the first rotating.

8. The torque augmentation device of claim 7, further comprising:
a second rotating ring;
the second rotating ring having a second inner face with a second-half magnet set;
the second rotating ring set at a second angle with respect to the rotor;
the second angle creating:
a second minimum magnetic gap measured at the closest point between the rotor and the second rotating ring;
a second maximum magnetic gap measured at the furthest point between the rotor and the second rotating ring;
the second magnet set magnetically interacting with the second-half magnet set;
the second angle resulting in an unbalanced magnetic force between the second magnet set and the second-half magnet set.

9. The torque augmentation device of claim 8, further comprising:
a second set of diversion magnets;
the second set of diversion magnets is adjacent to the second rotating ring;
the second set of diversion magnets interacts with a magnetic field generated by the second magnet set and the second-half magnet set;
the second set of diversion magnets interacting with the magnetic field for less than a full rotation of the second rotating ring, thereby unevenly affecting the magnetic field, thus causing an uneven torque.

10. The torque augmentation device of claim 7, further comprising:
a shaft;
the rotor and the first rotating ring both rotationally coupled to the shaft.

11. The torque augmentation device of claim 10, further comprising:
a source of rotational energy connected to the shaft;
a load connected to the shaft.

12. The torque augmentation device of claim 7, wherein the set of diversion magnets are mounted to a magnetic diversion plate formed from a ferrous material.

13. The torque augmentation device of claim 7, wherein the set of diversion magnets interacts with the first magnet set and first-half magnet set for one-half of a 360-degree rotation or less.

14. A device that captures an unbalanced torque, the device comprising:
a first rotor with a first set of magnets, a second rotor with a second set of magnets, and a third rotor with a third set of magnets;
the first rotor at an angle with respect to the second rotor, the angle being non-parallel and non-perpendicular;
the first rotor supported by first bearings, the first bearings supported by a first static plate;
a first magnetic diversion plate;
the first magnetic diversion plate interacting with magnetic fields captured by the first set of magnets and the second set of magnets;
the first magnetic diversion plate decreasing an attraction of the first set of magnets and the second set of magnets during a phase of rotation where the first rotor and the second rotor move away from each other, resulting in an uneven torque.

15. The device that captures an unbalanced torque of claim 14, wherein the first magnetic diversion plate is formed from a ferrous material, such as steel.

16. The device that captures an unbalanced torque of claim 14, wherein the first magnetic diversion plate further comprising a set of diversion magnets.

17. The device that captures an unbalanced torque of claim 14, further comprising:
    a second magnetic diversion plate;
        the second magnetic diversion plate adjacent to the third rotor and the second rotor;
        the second magnetic diversion plate interacting with a magnetic field generated by the third set of magnets and the second set of magnets;
        the second magnetic diversion plate interacting with the magnetic field for less than a full rotation of the first rotor, thereby unevenly affecting the magnetic field, thus causing an uneven torque.

18. The device that captures an unbalanced torque of claim 14, wherein the first magnetic diversion plate interacts with the first set of magnets and second set of magnets for one-half of a 360-degree rotation or less.

\* \* \* \* \*